(12) United States Patent
Watanabe et al.

(10) Patent No.: US 10,367,213 B2
(45) Date of Patent: Jul. 30, 2019

(54) METHOD OF CONTROLLING FUEL CELL SYSTEM

(71) Applicant: HONDA MOTOR CO., LTD., Tokyo (JP)

(72) Inventors: Shinya Watanabe, Wako (JP); Nobutaka Nakajima, Wako (JP); Yuji Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 15/662,286

(22) Filed: Jul. 28, 2017

(65) Prior Publication Data

US 2018/0034087 A1  Feb. 1, 2018

(30) Foreign Application Priority Data

Jul. 28, 2016 (JP) .................................. 2016-147929

(51) Int. Cl.
*H01M 8/04* (2016.01)
*H01M 8/04746* (2016.01)
*H01M 8/04014* (2016.01)
*H01M 8/04007* (2016.01)
*H01M 8/04029* (2016.01)
*H01M 8/04044* (2016.01)

(52) U.S. Cl.
CPC ... *H01M 8/04768* (2013.01); *H01M 8/04014* (2013.01); *H01M 8/04029* (2013.01); *H01M 8/04044* (2013.01); *H01M 8/04067* (2013.01); *H01M 2250/20* (2013.01); *Y02T 90/32* (2013.01)

(58) Field of Classification Search
None
See application file for complete search history.

(56) References Cited

FOREIGN PATENT DOCUMENTS

JP  2005-166497  6/2005
JP  2012-023795  2/2012

*Primary Examiner* — Ula C Ruddock
*Assistant Examiner* — Tony S Chuo
(74) *Attorney, Agent, or Firm* — Mori & Ward, LLP

(57) ABSTRACT

A method of controlling a fuel cell system includes circulating a coolant through a fuel cell circulation passage in which a fuel cell and a gas liquid separator are provided. A valve is controlled selectively to connect or disconnect the fuel cell circulation passage and an air conditioning equipment circulation passage in which an air conditioning mechanism is provided. The valve is maintained to connect the fuel cell circulation passage and the air conditioning equipment circulation passage to circulate the coolant through the air conditioning equipment circulation passage when it is determined that the coolant includes air bubbles more than or equal to the threshold amount, when the valve connects the fuel cell circulation passage and the air conditioning equipment circulation passage, and when a temperature of the fuel cell is higher than or equal to a threshold temperature even if the air conditioning mechanism stops.

9 Claims, 8 Drawing Sheets

METHOD OF CONTROLLING FUEL CELL SYSTEM

CROSS-REFERENCE TO RELATED APPLICATIONS

The present application claims priority under 35 U.S.C. § 119 to Japanese Patent Application No. 2016-147929, filed Jul. 28, 2016, entitled "Method of Controlling Fuel Cell System." The contents of this application are incorporated herein by reference in their entirety.

BACKGROUND

1. Field

The present disclosure relates to a method of controlling a fuel cell system.

2. Description of the Related Art

A fuel cell includes an electrolyte electrode structure where an anode is provided on one face of an electrolyte and a cathode is provided on the other face. A power generation cell (a unit cell) is configured by the electrolyte electrode structure being sandwiched between separators. Typically, a stack obtained by stacking a predetermined number of such power generation cells is used. This kind of fuel cell is installed in an automobile for example. In such vehicle-installed applications, a solid polymer electrolyte fuel cell where a polymer ion-exchange membrane constitutes an electrolyte is often employed.

Most automobiles are each equipped with an air conditioning mechanism (a so-called car air conditioner). In this case, the fuel cell and the car air conditioner share coolant. Thus, as described in Japanese Unexamined Patent Application Publication No. 2012-23795 and Japanese Unexamined Patent Application Publication No. 2005-166497, a first circulation supply passage through which the coolant circulates and is supplied to the fuel cell and a second circulation supply passage through which the coolant is supplied to the car air conditioner are provided. Further, the fuel cell is provided with a fuel gas supply flow passage for supplying fuel gas, such as hydrogen gas, to the anode or an oxidizer gas supply flow passage for supplying oxidizer gas, such as oxygen containing gas like compressed air, to the cathode. Thus, a fuel cell system is structured.

The first circulation supply passage and the second circulation supply passage are each provided with a coolant pump. Each coolant pump serves to boost the pressure of the coolant so as to increase the transfer speed of the coolant. That is, the coolant is forcibly transferred under the action of each coolant pump.

SUMMARY

According to one aspect of the present invention, a method of controlling a fuel cell system including a fuel cell, includes circulating a coolant through a fuel cell circulation passage in which the fuel cell and a gas liquid separator are provided. A valve is controlled selectively to connect or disconnect the fuel cell circulation passage and an air conditioning equipment circulation passage in which an air conditioning mechanism is provided. It is determined whether the coolant includes air bubbles more than or equal to a threshold amount. The valve is maintained to connect the fuel cell circulation passage and the air conditioning equipment circulation passage to circulate the coolant through the air conditioning equipment circulation passage when it is determined that the coolant includes air bubbles more than or equal to the threshold amount, when the valve connects the fuel cell circulation passage and the air conditioning equipment circulation passage, and when a temperature of the fuel cell is higher than or equal to a threshold temperature even if the air conditioning mechanism stops.

According to another aspect of the present invention, a method of controlling a fuel cell system including a fuel cell, includes circulating a coolant through a fuel cell circulation passage in which the fuel cell and a gas liquid separator are provided. A valve is controlled selectively to connect or disconnect the fuel cell circulation passage and an air conditioning equipment circulation passage in which an air conditioning mechanism is provided. It is determined whether the coolant includes air bubbles more than or equal to a threshold amount. The valve is maintained to connect the fuel cell circulation passage and the air conditioning equipment circulation passage to circulate the coolant through the air conditioning equipment circulation passage when it is determined that the coolant includes air bubbles more than or equal to the threshold amount, when the valve connects the fuel cell circulation passage and the air conditioning equipment circulation passage, and when a temperature of the fuel cell is higher than or equal to a threshold temperature even if a condition for issuing a command to disconnect the fuel cell circulation passage and the air conditioning equipment circulation passage is satisfied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
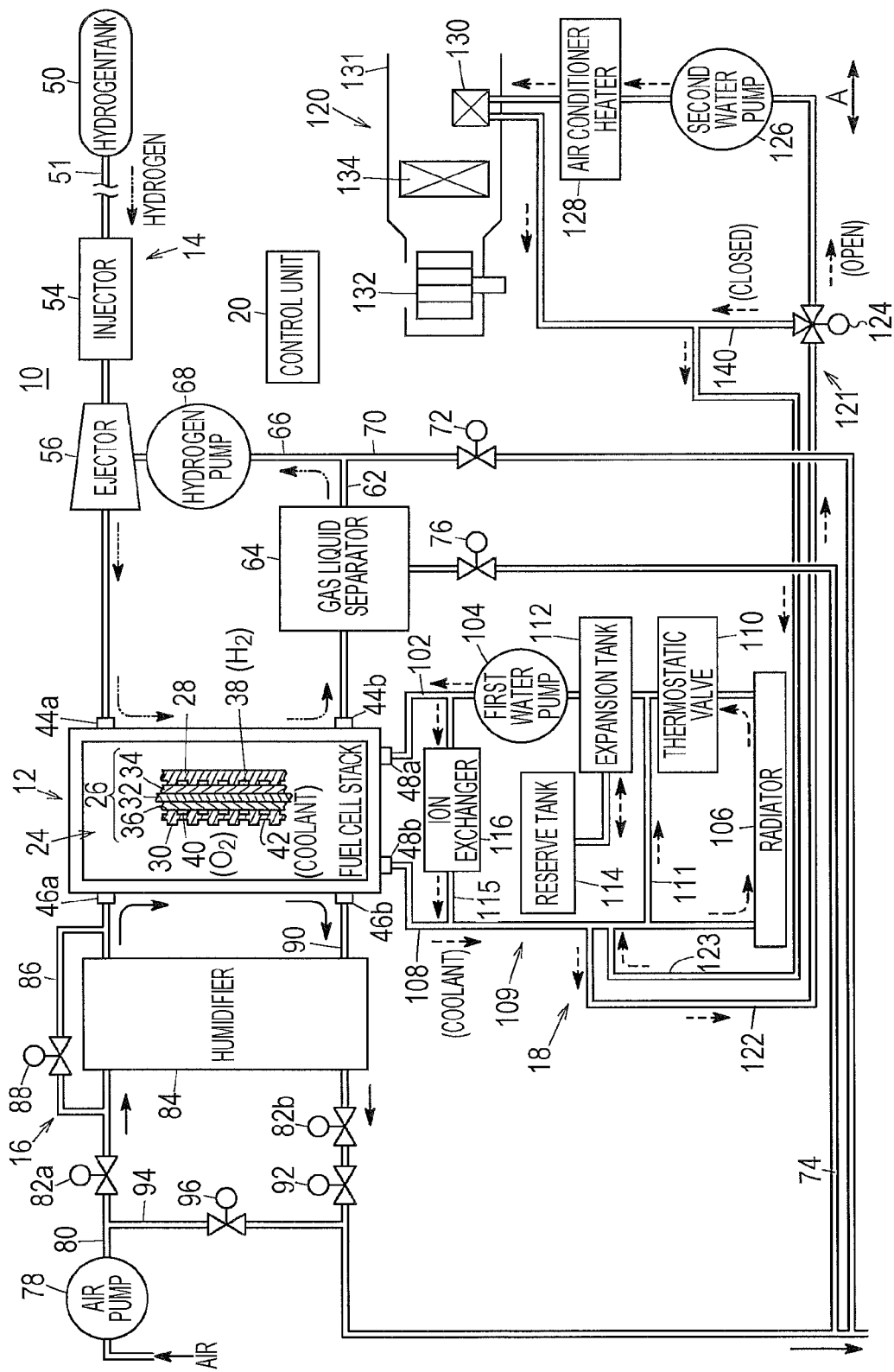
FIG. 1 is an explanatory schematic diagram of a configuration of a fuel cell system to which a control method according to an embodiment of the present application is applied.

The embodiments will now be described with reference to the accompanying drawings, wherein like reference numerals designate corresponding or identical elements throughout the various drawings.

A method of controlling a fuel cell system according to the present application is described in detail below in preferred embodiments by referring to the drawings.

A fuel cell system 10 is described first by referring to FIG. 1, which is an explanatory schematic diagram of a configuration of the fuel cell system 10. The fuel cell system 10 includes a fuel cell stack (a fuel cell) 12.

The fuel cell stack 12 includes a fuel gas supply unit 14, which supplies fuel gas, an oxidizer gas supply unit 16, which supplies oxidizer gas, and a coolant supply unit 18, which supplies coolant. In the present embodiment, hydrogen gas is used as the fuel gas and compressed air is used as the oxidizer gas. The fuel cell system 10 further includes a control unit 20, which is a system controller.

The fuel cell stack 12 is made up of a plurality of power generation cells 24 stacked in a direction indicated by arrow A in FIG. 1, which is a horizontal direction or a vertical direction. The power generation cell 24 is obtained by sandwiching an electrolyte membrane electrode structure 26 between a first separator 28 and a second separator 30. The first separator 28 and the second separator 30 are formed from metal or carbon.

The electrolyte membrane electrode structure 26 includes for example, a solid polyelectrolyte membrane 32, which is a perfluorosulfonic acid membrane containing moisture, and an anode 34 and a cathode 36 between which the solid polyelectrolyte membrane 32 is sandwiched. As the solid polyelectrolyte membrane 32, hydrocarbon (HC)-based electrolyte may be employed instead of the above-described fluorine-based electrolyte.

Between the first separator 28 and the electrolyte membrane electrode structure 26, the first separator 28 is provided with a hydrogen gas flow passage (a fuel gas flow passage) 38 for supplying hydrogen gas to the anode 34. Between the second separator 30 and the electrolyte membrane electrode structure 26, the second separator 30 is provided with an air flow passage 40 for supplying air to the cathode 36. Between the first separator 28 and the second separator 30 that are adjacent to each other, a coolant flow passage 42 through which the coolant is allowed to flow is provided.

The fuel cell stack 12 are provided with a hydrogen gas inlet 44a, a hydrogen gas outlet 44b, an air inlet 46a, an air outlet 46b, a coolant inlet 48a, and a coolant outlet 48b. The hydrogen gas inlet 44a penetrates in the direction in which the power generation cells 24 are stacked and is linked with the supply side of the hydrogen gas flow passage 38. Similarly, the hydrogen gas outlet 44b also penetrates in the direction in which the power generation cells 24 are stacked, and is linked with the discharge side of the hydrogen gas flow passage 38. The hydrogen gas flow passage 38, the hydrogen gas inlet 44a, and the hydrogen gas outlet 44b constitute an anode flow passage.

Similarly, the air inlet 46a penetrates in the direction in which the power generation cells 24 are stacked and is linked with the supply side of the air flow passage 40. The air outlet 46b penetrates in the direction in which the power generation cells 24 are stacked and is linked with the discharge side of the air flow passage 40. The air flow passage 40, the air inlet 46a, and the air outlet 46b constitute a cathode flow passage.

Further, the coolant inlet 48a penetrates in the direction in which the power generation cells 24 are stacked and is linked with the supply side of the coolant flow passage 42. The coolant outlet 48b penetrates in the direction in which the power generation cells 24 are stacked and is linked with the discharge side of the coolant flow passage 42.

The fuel gas supply unit 14 includes a hydrogen tank 50 for storing high-pressure hydrogen gas and the hydrogen tank 50 is connected to the hydrogen gas inlet 44a of the fuel cell stack 12 through a hydrogen gas supply passage (a fuel gas supply flow passage) 51. The hydrogen gas supply passage 51 supplies hydrogen gas to the fuel cell stack 12.

In the hydrogen gas supply passage 51, an injector 54 and an ejector 56 are provided in series. When the pressure in the ejector 56 becomes negative, hydrogen from a hydrogen circulation flow passage 66 is sucked.

A hydrogen gas discharge passage (an anode off-gas discharge passage) 62 is connected to the hydrogen gas outlet 44b of the fuel cell stack 12. The hydrogen gas discharge passage 62 derives discharge hydrogen gas (anode off-gas), which is hydrogen gas used at least partially at the anode 34, from the fuel cell stack 12.

The hydrogen gas discharge passage 62 is provided with a gas liquid separator 64. The hydrogen circulation flow passage 66 branches from the downstream of the gas liquid separator 64 and the downstream side of the hydrogen circulation flow passage 66 is connected to the ejector 56. The hydrogen circulation flow passage 66 is provided with a hydrogen pump 68. Particularly on activation, the hydrogen pump 68 causes the anode off-gas discharged to the hydrogen gas discharge passage 62 to circulate to the hydrogen gas supply passage 51 through the hydrogen circulation flow passage 66 and the ejector 56.

An end of a purge flow passage 70 is linked with the hydrogen gas discharge passage 62 and on the purge flow passage 70, the purge valve 72 is provided. An end of a drain flow passage 74 from which fluid mainly containing a liquid constituent is discharged is connected to a bottom portion of the gas liquid separator 64. On the drain flow passage 74, a drain valve 76 is provided.

The oxidizer gas supply unit 16 includes an air pump 78 as an oxidizer gas supply mechanism provided on an air supply passage (an oxidizer gas supply flow passage) 80. The air pump 78 is configured as a compressor including a motor that is a rotation driving unit so as to compress and supply atmosphere (air). That is, the air pump 78 compresses atmosphere with the rotation of a motor and supplies the resultant compressed air from the air supply passage 80 to the fuel cell stack 12.

Since the air pump 78 having the above-described configuration is known, detailed description of the air pump 78 is omitted.

The air supply passage 80 is positioned on the downstream side of the air pump 78 and is connected to the air inlet 46a of the fuel cell stack 12, and between the air pump 78 and the fuel cell stack 12, a supply-side open/close valve (an inlet sealing valve) 82a and a humidifier 84 are interposed. A bypass supply passage 86 for detouring around the humidifier 84 is connected to the air supply passage 80. The bypass supply passage 86 is provided with an open/close valve 88.

An air discharge passage (a cathode off-gas discharge passage) 90 is connected to the air outlet 46b of the fuel cell stack 12. The air discharge passage 90 allows discharge compressed air (cathode off-gas), which is compressed air used at least partially at the cathode 36, to be discharged from the fuel cell stack 12.

Downstream of the air discharge passage 90, the humidifier 84 is provided and thus, the humidifier 84 exchanges moisture and heat between the compressed air supplied from the air pump 78 and the cathode off-gas. Further, on the downstream side of the humidifier 84, a discharge-side open/close valve (an outlet sealing valve) 82b and a back pressure valve 92 are provided on the air discharge passage 90. Downstream of the air discharge passage 90, the other end of the purge flow passage 70 and the other end of the drain flow passage 74 are connected and join to constitute a dilution unit, accordingly.

The back pressure valve 92 is a pressure adjustment valve provided so as to control the pressure of the compressed air that is supplied to the cathode flow passage. That is, the back pressure valve 92 regulates the internal pressure of the cathode 36.

Both ends of a bypass flow passage 94 are linked with the air supply passage 80 and the air discharge passage 90, positioned on the upstream side of the supply-side open/close valve 82a, on the downstream side of the discharge-side open/close valve 82b, and on the downstream side of the back pressure valve 92. The bypass flow passage 94 is provided with a bypass (BP) flow rate adjustment valve 96 for adjusting the flow rate of air flowing through the bypass flow passage 94.

The coolant supply unit 18 includes a coolant supply passage 102, which is connected to the coolant inlet 48a of the fuel cell stack 12, and a first water pump (a first coolant pump) 104 is placed on the coolant supply passage 102. The coolant supply passage 102 is connected to a radiator 106 and a coolant discharge passage 108 linked with the coolant outlet 48b is connected to the radiator 106.

The coolant discharge passage 108 and the coolant supply passage 102 constitute a first coolant circulation passage 109 as a fuel cell-side coolant circulation flow passage. That is, the coolant supply passage 102 is a return passage of the first coolant circulation passage 109 directed to the fuel cell stack 12 from the radiator 106, and the coolant discharge passage 108 is an outward passage directed to the radiator 106 from the fuel cell stack 12.

The coolant supply passage 102 is provided with the thermostatic valve 110. The thermostatic valve 110 automatically enters the open state when the temperature of the coolant flowing through the coolant supply passage 102 is high, or automatically enters the closed state when the temperature is low. Since such operating principles of the thermostatic valve 110 are known as described in for example, Japanese Unexamined Patent Application Publication No. 2014-232684, detailed description thereof is omitted.

Between the coolant discharge passage 108 and the coolant supply passage 102, a bypass passage 111 for detouring around the radiator 106 and the thermostatic valve 110 is provided. That is, the coolant discharge passage 108 and the coolant supply passage 102 are linked through the bypass passage 111. Accordingly, when the thermostatic valve 110 is in the closed state, the coolant that flows through the coolant discharge passage 108 travels to the coolant supply passage 102 through the bypass passage 111.

On the downstream side of the thermostatic valve 110, an expansion tank (a gas liquid separator) 112 is provided and a reserve tank (a coolant reservoir) 114, which allows the coolant to travel between the reserve tank 114 and the expansion tank 112 is arranged. That is, when necessary, the coolant is supplied to the reserve tank 114 from the expansion tank 112 or coolant is supplied to the expansion tank 112 from the reserve tank 114.

The thermostatic valve 110 and the expansion tank 112 described above are interposed between the radiator 106 and the first water pump 104. On the downstream side of the first water pump 104, a branch pipe 115, which branches from the coolant supply passage 102 to join the coolant discharge passage 108, and on the branch pipe 115, an ion exchanger 116 is interposed. The ion exchanger 116 prevents liquid junction of the fuel cell stack 12 by removing ions contained in the coolant.

In the coolant discharge passage 108, a second coolant circulation passage (an air conditioning equipment-side coolant circulation flow passage) 121, which branches from the coolant discharge passage 108 and extends through a car air conditioner (an air conditioning mechanism) 120, and then joins the coolant discharge passage 108, is provided. The second coolant circulation passage 121 includes an outward passage 122 directed to the car air conditioner 120 from the coolant discharge passage 108, and a return passage 123 directed to the coolant discharge passage 108 from the car air conditioner 120.

On the outward passage 122, a three-way valve 124, a second water pump (a second coolant pump) 126, and an air conditioner heater 128 are interposed in this order from the upstream side. The side more downstream in the outward passage 122 than the air conditioner heater 128 is connected to a compressor 130 included in the car air conditioner 120.

The car air conditioner 120 includes a duct casing 131 and in the duct casing 131, an air blower 132, an evaporator 134, an air mixing door, not illustrated, and the compressor 130 are placed in this order from the upstream side. The air blower 132 takes in air inside or outside a vehicle by rotating under the action of a motor and conducts a function of sending the air taken in into the duct casing 131.

When air is conditioned, the evaporator 134 functions as a vaporizer and cools the air supplied from the air blower 132. The compressor 130 compresses the coolant. The coolant supplied to the compressor 130 is heated and its temperature is raised when the air conditioner heater 128 is urged.

An air mixing door is constituted of for example, a rotatable door and by rotating in accordance with a command from the control unit 20, the degree of opening is adjusted. Thus, the flow rate ratio between the air that flows into the compressor 130 and the air that detours around the compressor 130, that is, the temperature of the conditioned air supplied to vehicle room is adjusted.

The return passage 123 directed to the coolant discharge passage 108 from the compressor 130 is provided with a bypass branch pipe 140 extending to the three-way valve 124. Accordingly, the outward passage 122 and the compressor 130 are selectively switched to the connected state or the disconnected state by the three-way valve 124 being operated.

The method of controlling the fuel cell system 10 according to the present embodiment is described next in relation to the operation of the fuel cell system 10 referring to a flowchart in FIG. 8.

The fuel cell system 10 configured as described above is installed in for example, a fuel cell vehicle, not illustrated, such as a fuel cell electric automobile. Described below is the case in which the fuel cell system 10 is installed in a fuel cell vehicle.

When the operation of the fuel cell vehicle is started, the fuel cell stack 12 is activated with the ignition turned on. At the time, the control unit 20 transmits a command signal for opening the injector 54 so as to supply hydrogen gas from the fuel gas supply unit 14 to the anode flow passage. Thus, a predetermined amount of the hydrogen gas supplied from the hydrogen tank 50 to the hydrogen gas supply passage 51 passes through the injector 54 and the ejector 56 to be supplied to the hydrogen gas inlet 44a of the fuel cell stack 12.

The hydrogen gas is further guided from the hydrogen gas inlet 44a to the hydrogen gas flow passage 38 and travels along the hydrogen gas flow passage 38. Thus, the hydrogen gas is supplied to the anode 34 of the electrolyte membrane electrode structure 26.

The control unit 20 issues a command signal for urging the air pump 78 so that compressed air is supplied from the oxidizer gas supply unit 16. Accordingly, atmosphere is compressed under the action of the rotation of the air pump 78 and sent to the air supply passage 80 as the compressed air. The compressed air is humidified when passing through the humidifier 84 and after that, is supplied to the air inlet 46a of the fuel cell stack 12. The compressed air is guided from the air inlet 46a to the air flow passage 40 and after that, travels along the air flow passage 40 and is thus supplied to the cathode 36 of the electrolyte membrane electrode structure 26.

Figure 8:
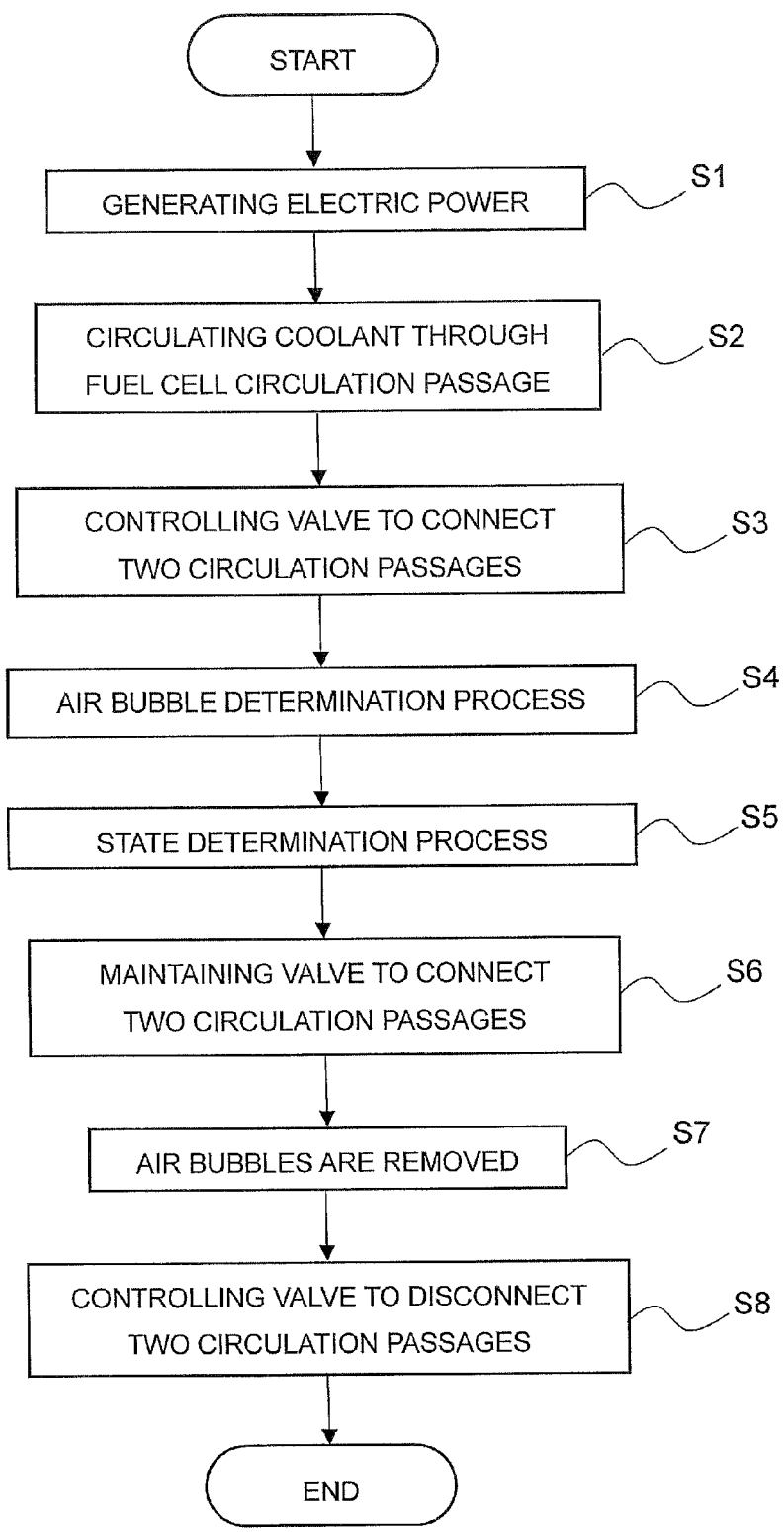
FIG. 8 is a flowchart illustrating a method of controlling the fuel cell system.

Accordingly, in each electrolyte membrane electrode structure 26, the hydrogen gas supplied to the anode 34 and the oxygen in the compressed air supplied to the cathode 36 are consumed by electrochemical reaction in an electrode-catalytic layer and electricity is generated (step S1 in FIG. 8). Part of the moisture added to the compressed air in the humidifier 84 enters the solid polyelectrolyte membrane 32 from the cathode 36 and reaches the anode 34.

The hydrogen gas supplied to the anode 34 and partially consumed is discharged as the anode off-gas from the hydrogen gas outlet 44b to the hydrogen gas discharge passage 62. At the time, the anode off-gas accompanies the moisture that reaches the anode 34 as described above. That is, the anode off-gas guided to the gas liquid separator 64 is damp gas that contains moisture.

In the gas liquid separator 64, most part of the moisture in the anode off-gas is separated. The liquid part (water) is discharged from the drain flow passage 74 by the drain valve 76 being opened. While containing mist that slightly remains, the anode off-gas from which the moisture is separated is guided from the hydrogen gas discharge passage 62 to the hydrogen circulation flow passage 66 under the action of the hydrogen pump 68. Further, the anode off-gas is sucked from the hydrogen circulation flow passage 66 to the ejector 56, passes through the injector 54, joins new hydrogen gas, and is supplied from the hydrogen gas supply passage 51 to the anode flow passage. Thus, the anode off-gas circulates and is supplied to the fuel cell stack 12.

The anode off-gas discharged to the hydrogen gas discharge passage 62 is discharged (purged) outside under the action of the opening of the purge valve 72 when necessary.

Similarly, the compressed air supplied to the cathode 36 and partially consumed is discharged as the cathode off-gas from the air outlet 46b to the air discharge passage 90. The cathode off-gas humidifies new compressed air supplied from the air supply passage 80 through the humidifier 84 and is then adjusted to a set pressure of the back pressure valve 92 to be discharged to a dilution unit.

While the fuel cell stack 12 is being operated as described above, in the coolant supply unit 18, the coolant, such as pure water, ethylene glycol, or oil, is supplied from the coolant supply passage 102 to the coolant inlet 48a of the fuel cell stack 12 under the action of the first water pump 104. The coolant flows along the coolant flow passage 42 to cool the power generation cells 24 and is then discharged from the coolant outlet 48b to the coolant discharge passage 108.

Immediately after the activation of the fuel cell stack 12, the coolant derived from the fuel cell stack 12 has a low temperature and thus the thermostatic valve 110 is closed. At the time, the coolant passes through the bypass passage 111 to travel through the coolant supply passage 102, and further passes through the expansion tank 112 and the first water pump 104 to be returned from the coolant inlet 48a to the coolant flow passage 42 in the fuel cell stack 12.

In contrast, when the temperature of the fuel cell stack 12 sufficiently rises and the temperature of the coolant becomes sufficiently high, the thermostatic valve 110 is switched to the open state. Accordingly, the coolant is guided to the radiator 106 to be cooled and after that, passes through the thermostatic valve 110, the expansion tank 112, and the first water pump 104 to be returned from the coolant inlet 48a to the coolant flow passage 42 in the fuel cell stack 12. In the manner described above, the coolant circulates and flows through the first coolant circulation passage 109 (step S2 in FIG. 8). That is, the coolant circulates and is supplied to the fuel cell stack 12.

When the three-way valve 124 is operated in the direction where the outward passage 122 becomes connected to the second water pump 126 and the second water pump 126 is urged, part of the coolant that flows through the coolant discharge passage 108 is distributed to the outward passage 122, which constitutes the second coolant circulation passage 121, by being sucked by the second water pump 126 (step S3 in FIG. 8). The coolant distributed to the outward passage 122 is forcibly transferred to the compressor 130 through the air conditioner heater 128 under the action of the second water pump 126.

The air blower 132 is rotated by the motor urged under the control action of the control unit 20. Thus, air is supplied into the duct casing 131. The control unit 20 further adjusts the degree of the opening of the air mixing door and regulates the amount of the air in contact with the compressor 130. At the time, heat transfer is performed between the coolant flowing in the compressor 130 and the air in contact with the compressor 130. That is, the heat of the coolant is seized by the air.

As a result, the air is heated and the coolant is cooled. The heated air is supplied to the inside of the fuel cell vehicle as a heat source for room heating. Since the three-way valve 124 is in a state of allowing the return passage 123 and the coolant discharge passage 108 to be linked with each other, the cooled coolant is returned to the coolant discharge passage 108 through the return passage 123 and after that, flows to the side of the radiator 106.

Into the outward passage 122, new coolant flows from the coolant discharge passage 108. Accordingly, the coolant circulates and flows in the second coolant circulation passage 121. That is, the coolant circulates and is supplied to the car air conditioner 120.

While the coolant flows through the first coolant circulation passage 109 as described above, the expansion tank 112 stores the coolant temporarily. During this storage, the coolant is separated into a vapor phase and a liquid phase. The vapor phase is released outside the expansion tank 112 through a pressure release valve with which the expansion tank 112 is provided. To compensate for the reduced amount of the released coolant, a predetermined amount is supplied to the expansion tank 112 from the coolant stored in the reserve tank 114.

The volume of the coolant changes with a rise or drop in temperature. When for example, the temperature rises and the coolant expands, the coolant is transferred from the expansion tank 112 to the reserve tank 114. Conversely, when the coolant shrinks, the coolant is replenished from the reserve tank 114 to the expansion tank 112.

When the coolant is supplied to the expansion tank 112 by an amount beyond the gas liquid separation performance of the expansion tank 112, it is assumed that air remains in the coolant. Under such circumstances, the first water pump 104 can cause idle running and performance in forcible transfer of the coolant can decrease and, as a result, cooling performance can decrease. In the present embodiment, therefore, when air is recognized as being caught in the coolant, control for removing the air is performed. Thus, an air bubble determination process is performed first (step S4 in FIG. 8).

Whether air is caught in the coolant, in other words, at least one air bubble is trapped in the coolant can be determined on the basis of for example, the number of revolutions of the first water pump 104. That is, the number of revolutions of the first water pump 104 rises as air bubbles trapped in the coolant increase. Accordingly, when the number of revolutions of the first water pump 104 is larger than or equal to a predetermined value, the control unit 20 recognizes that "air bubbles more than or equal to a predetermined amount are trapped in the coolant."

For another example, the determination may be performed on the basis of the liquid level in the reserve tank 114. As the liquid level in the reserve tank 114 becomes lower, more air bubbles are likely to be trapped in the coolant. That is, when the liquid level in the reserve tank 114 is lower than or equal to a predetermined lower-limit threshold, the control unit 20 may also be caused to recognize that "air bubbles more than or equal to a predetermined amount are trapped in the coolant."

Not to mention, both of these may be used concurrently. That is, when a timing at which the number of revolutions of the first water pump 104 becomes larger than or equal to the predetermined value or a timing at which the liquid level in the reserve tank 114 becomes lower than or equal to the predetermined lower-limit threshold arrives first, the control unit 20 may also be caused to recognize that "air bubbles more than or equal to a predetermined amount are trapped in the coolant."

When the control unit 20 recognizes that "air bubbles more than or equal to a predetermined amount are trapped in the coolant," the control unit 20 determines whether the three-way valve 124 is operated in the direction where the outward passage 122 and the compressor 130 become connected or is operated in the direction where the outward passage 122 and the compressor 130 become disconnected (a state determination process (step S5 in FIG. 8)).

When for example, the user has started using the car air conditioner 120 before the air bubble determination process is performed, the three-way valve 124 is operated in the direction where the outward passage 122 and the compressor 130 become connected. That is, the outward passage 122 and the compressor 130 are in the connected state. Thus, the coolant that flows into the outward passage 122 from the coolant discharge passage 108 is directed to the compressor 130.

Figure 2:
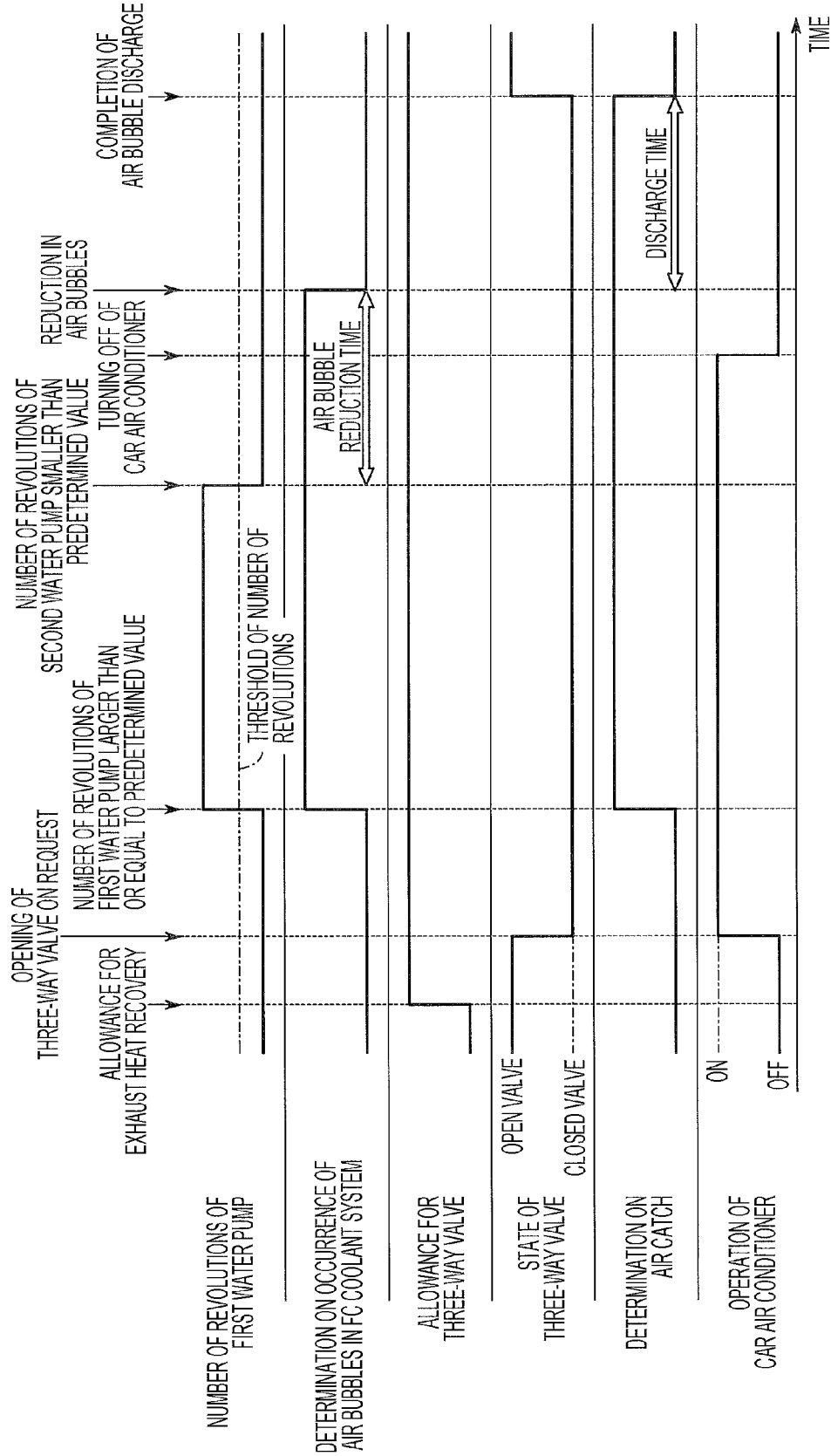
FIG. 2 is a schematic time chart of the control method.

In this case, the control unit 20 recognizes that "air bubbles are also trapped in the coolant flowing through the second coolant circulation passage 121." When the control unit 20 makes such determination and the temperature of the fuel cell stack 12 is larger than or equal to a predetermined temperature, even if the user stops using the car air conditioner 120 while air bubbles are being removed, the three-way valve 124 is not operated as illustrated in FIG. 2 (step S6 in FIG. 8). That is, the outward passage 122 and the compressor 130 are not disconnected and the connected state is maintained. In FIG. 2, the state of the three-way valve 124 in a case where the outward passage 122 and the compressor 130 are in the connected state is referred to as the "open valve" and that in a case in the disconnected state is referred to as the "closed valve."

Figure 3:
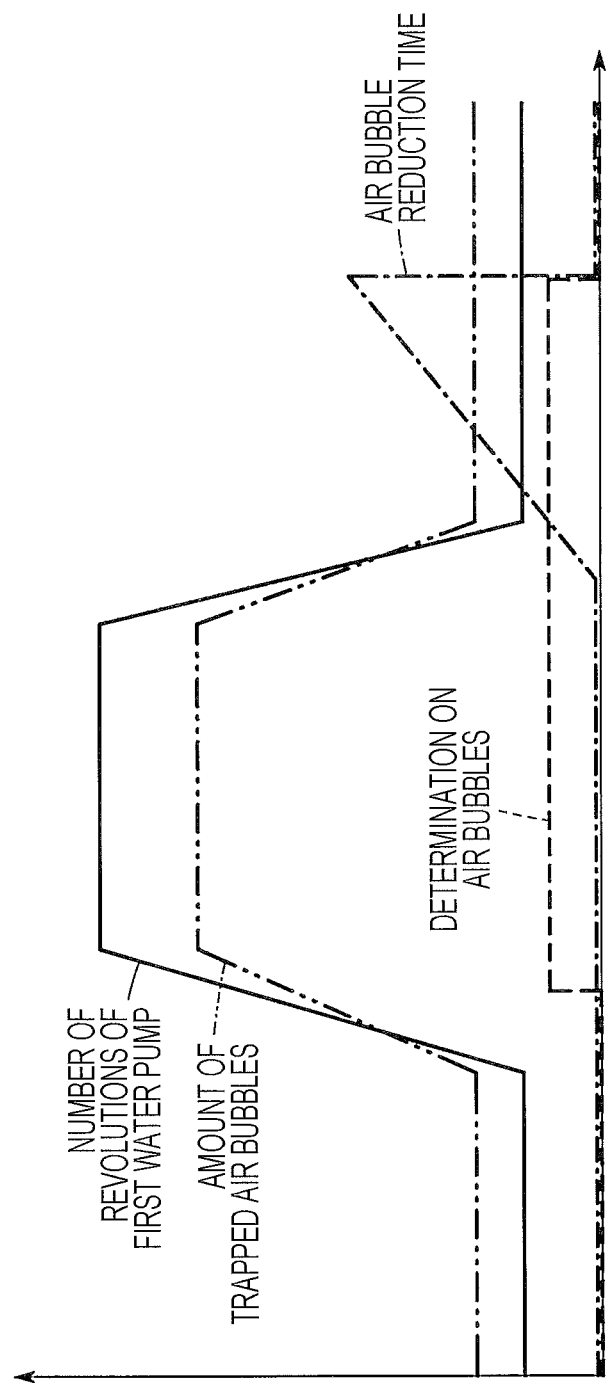
FIG. 3 is a graph that illustrates relation between the number of revolutions of a first water pump, which is a first coolant pump, and the amount of air bubbles trapped in coolant.
Figure 4:
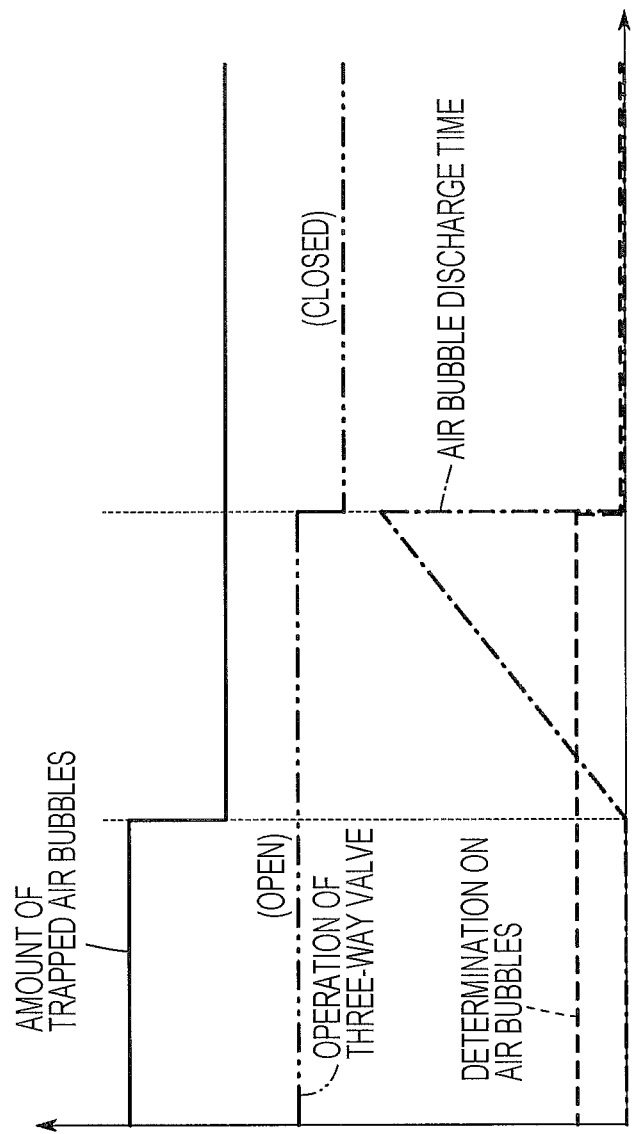
FIG. 4 is a graph that illustrates the amount of the air bubbles trapped in the coolant and the operation state of a three-way valve.

On the other hand, as illustrated in FIG. 3, the number of revolutions of the first water pump 104 is reduced so as to be lower than or equal to the predetermined value. As a result, the coolant supplied to the expansion tank 112 has an amount that suits the gas liquid separation performance of the expansion tank 112. That is, the vapor phase included in the coolant is separated from the liquid phase. Thus, as illustrated in FIGS. 3 and 4, removal of the air bubbles trapped in the coolant is started. Since the outward passage 122 and the compressor 130 are not connected yet, air bubbles are removed from both the coolant in the first coolant circulation passage 109 and the coolant in the second coolant circulation passage 121. The "amount of trapped air bubbles" in FIG. 3 indicates a value in the first coolant circulation passage 109 and the similar applies to the other drawings.

When the number of revolutions of the first water pump 104 is reduced and predetermined time elapses, the control unit 20 determines that air bubbles are sufficiently discharged and the amount of the air bubbles is within tolerance (step S7 in FIG. 8). On the basis of this determination, the control unit 20 causes the three-way valve 124 to be operated in the direction where the outward passage 122 and the compressor 130 become disconnected (step S8 in FIG. 8).

Thus, the coolant with the amount of air bubbles that is reduced within tolerance is filled in the second coolant circulation passage 121. Accordingly, it can be avoided that when the operation of the fuel cell vehicle is resumed after the operation of the fuel cell vehicle had been stopped and predetermined time has elapsed, the second water pump 126 senses air bubbles and causes incorrect stopping.

The above-described air bubble removal control may be performed while stopping the fuel cell vehicle and the fuel cell system 10. That is, when a command to "stop the operation of the fuel cell system 10" is issued during the operation of the fuel cell vehicle and as described above, the control unit 20 determines that "air is trapped in the coolant," the air bubbles are removed while the operation stopping process is being performed.

By switching the outward passage 122 and the compressor 130 between the connected state and the disconnected state using the three-way valve 124 in this manner, it is enabled to remove air bubbles from both the coolant in the first coolant circulation passage 109 and the coolant in the second coolant circulation passage 121, and to fill the coolant with the amount of air bubbles that is reduced within tolerance in the second coolant circulation passage 121. Thus, at a subsequent start of the operation of the fuel cell vehicle, the second water pump 126 operates normally and the coolant can flow in the second coolant circulation passage 121.

In addition, simply by providing a single expansion tank, 112, it is enabled to remove air bubbles from the coolant in the first coolant circulation passage 109 and the coolant in the second coolant circulation passage 121. Accordingly, increase in the size of the fuel cell system 10 can be avoided. As a result, flexibility in placement layout in the fuel cell vehicle increases.

The above-described air bubble removal control is performed when the fuel cell stack 12 is maintained at the predetermined temperature or higher after the state determination process. That is, when the temperature of the fuel cell stack 12 is higher than or equal to the predetermined temperature, for example, even if the user stops using the car air conditioner 120 after the state determination process, the three-way valve 124 is not operated in the direction where the outward passage 122 and the compressor 130 become disconnected.

In contrast, even when it is determined in the air bubble determination process that air bubbles more than or equal to the predetermined amount are trapped in the coolant, if after that, the temperature of the fuel cell stack 12 falls below the predetermined temperature, it is desirable to disconnect the outward passage 122 and the compressor 130. This is because further decrease in the temperature of the fuel cell stack 12 can be avoided accordingly.

That is, when for example, even after the state determination process, the temperature of the fuel cell stack 12 falls below a predetermined value, it is desirable to issue a command to operate the three-way valve 124 in the direction where the outward passage 122 and the compressor 130 are disconnected. Not to mention, the command is issued by the control unit 20.

When after this operation is performed, the temperature of the fuel cell stack 12 becomes higher than or equal to the predetermined temperature, the three-way valve 124 may be operated under the control action of the control unit 20 to connect the outward passage 122 and the compressor 130.

In the description above, a timing to execute a command for operating the three-way valve 124 in the direction where the outward passage 122 and the compressor 130 become disconnected may be set as desired according to conditions of the fuel cell system 10. For example, immediately after the command is issued from the control unit 20, the three-way valve 124 may be operated. When the air bubble removal operation is performed as described above, the three-way valve 124 may be operated after the removal operation ends.

The present application is not particularly limited to the above-described embodiments and various changes may be made within the scope not departing from the spirit of the present application.

Figure 5:
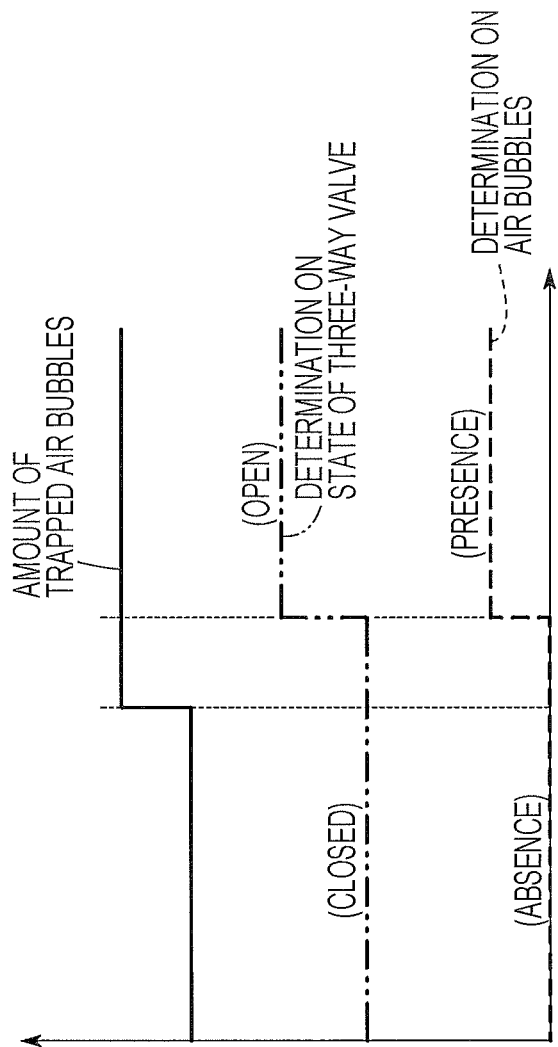
FIG. 5 is a graph that illustrates relation between the operation state of the three-way valve and determination of presence or absence of a trapped air bubble in an air conditioning equipment-side coolant circulation flow passage.
Figure 6:
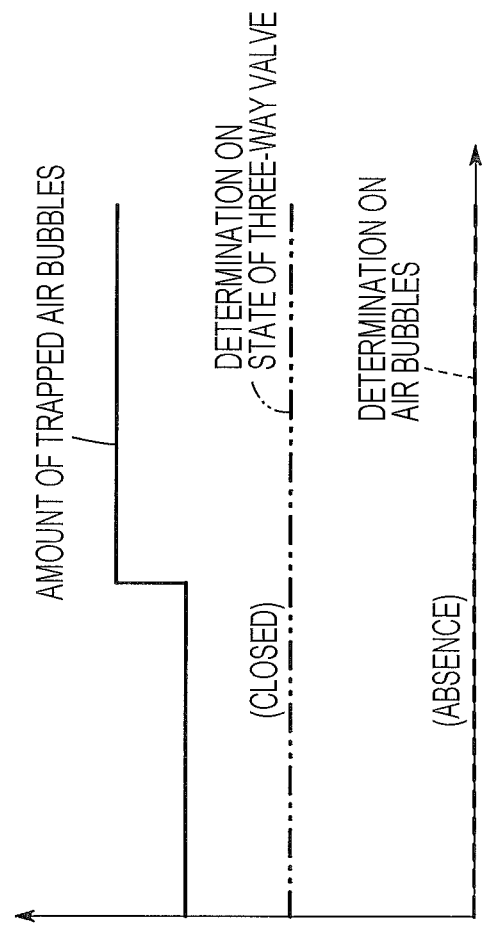
FIG. 6 is a graph that illustrates relation between the operation state of the three-way valve and determination of presence or absence of a trapped air bubble in the air conditioning equipment-side coolant circulation flow passage according to an example different from FIG. 5.
Figure 7:
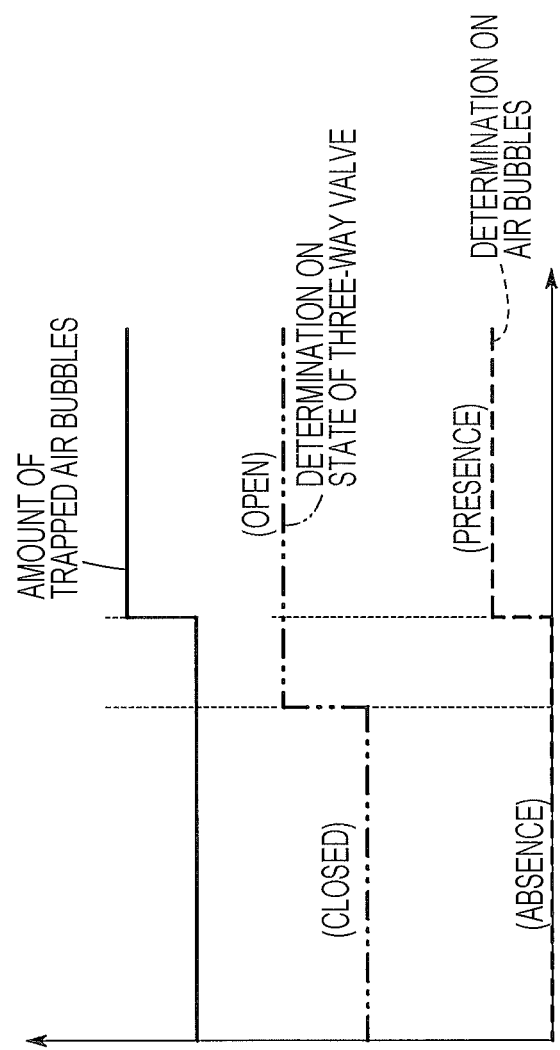
FIG. 7 is a graph that illustrates relation between the operation state of the three-way valve and determination of presence or absence of a trapped air bubble in the air conditioning equipment-side coolant circulation flow passage according to an example different from FIGS. 5 and 6.

When for example, the outward passage 122 and the compressor 130 are in the disconnected state, the control unit 20 may be caused to determine that "the coolant in the second coolant circulation passage 121 includes no air bubble trapped." That is, in this case, when it is determined in the air bubble determination process that air bubbles are trapped in the coolant, as illustrated in FIGS. 5 to 7, the control unit 20 determines that " air bubbles are trapped in the coolant in the second coolant circulation passage 121" only in the case where the outward passage 122 and the compressor 130 are in the connected state.

The present disclosure describes a method of controlling a fuel cell system including a fuel cell that generates electricity by electrochemical reaction between fuel gas supplied to an anode through a fuel gas supply flow passage and oxidizer gas supplied to a cathode through an oxidizer gas supply flow passage, a fuel cell-side coolant circulation flow passage through which coolant circulates and is supplied to a coolant flow passage provided in the fuel cell, a heat exchanger that is provided on the fuel cell-side coolant circulation flow passage and cools the coolant by heat exchange with air, a gas liquid separator that is provided on a downstream side of the heat exchanger on the fuel cell-side coolant circulation flow passage and separates the coolant into a vapor phase and a liquid phase, a first coolant pump provided on the fuel cell-side coolant circulation flow passage, an air conditioning mechanism that shares the coolant with the fuel cell, an air conditioning equipment-side coolant circulation flow passage that branches from the fuel cell-side coolant circulation flow passage and returns to the fuel cell-side coolant circulation flow passage through the air conditioning mechanism and through which the coolant circulates and is supplied to the air conditioning mechanism, a second coolant pump provided on the air conditioning equipment-side coolant circulation flow passage, and a three-way valve that selectively connects or disconnects the air conditioning equipment-side coolant circulation flow passage and the air conditioning mechanism, the method including: an air bubble determination process in which whether air bubbles more than or equal to a predetermined amount are trapped in the coolant flowing through the air conditioning equipment-side coolant circulation flow passage is determined; and a state determination process in which when it is determined in the air bubble determination process that air bubbles more than or equal to the predetermined amount are trapped in the coolant, whether the air conditioning equipment-side coolant circulation flow passage and the air conditioning mechanism are in a connected state or a disconnected state is determined, wherein when it is determined in the state determination process that the air conditioning equipment-side coolant circulation flow passage and the air conditioning mechanism are in the connected state and when a temperature of the fuel cell is higher than or equal to a predetermined temperature, connection is maintained even if a command to cause the disconnected state by operating the three-way valve is issued.

That is, when air bubbles are removed while the air conditioning equipment-side coolant circulation flow passage and the air conditioning mechanism are in the connected state, even if a command to disconnect the air conditioning equipment-side coolant circulation flow passage and the air conditioning mechanism (i.e. to interrupt the connection therebetween) is issued, the connected state is maintained. Accordingly, air bubbles can be removed from both the coolant in the fuel cell-side coolant circulation flow passage and the coolant in the air conditioning equipment-side coolant circulation flow passage.

Then, after the amount of air bubbles is reduced within tolerance, the air conditioning equipment-side coolant circulation flow passage and the air conditioning mechanism are disconnected in accordance with the command. Thus, coolant with the amount of air bubbles that is reduced within tolerance is filled in the air conditioning equipment-side coolant circulation flow passage. Accordingly, it can be avoided that on subsequent activation of the fuel cell system, determination indicating that "air bubbles are trapped in the second coolant pump" is made and incorrect stopping is caused.

Additionally, in this case, even when the number of gas liquid separators is only one, while air bubbles are being removed, the connected state between the air conditioning equipment-side coolant circulation flow passage and the air conditioning mechanism is maintained. Thus, air bubbles can be removed from both the coolant in the fuel cell-side coolant circulation flow passage and the coolant in the air conditioning equipment-side coolant circulation flow passage. Accordingly, increase in the size of the fuel cell system can be avoided. Since increase in space for placing the fuel cell system, which the increase in size involves, can be avoided, flexibility in placement layout increases when the fuel cell system is installed in an automobile for example.

This control method can be performed in stopping the operation of the fuel cell. That is, when it is determined that "air is trapped in the coolant" at the time of issue of a command indicating "stop the operation" while the fuel cell is operating, the above-described air bubble removal control is performed during the operation stopping process.

Whether any air bubble is trapped in the coolant can be determined on the basis of for example, the number of revolutions of the first coolant pump. This is because the number of revolutions of the first coolant pump rises as the amount of the trapped air bubbles increases. Accordingly, when the number of revolutions of the first coolant pump is larger than or equal to a predetermined value, it can be determined in the air bubble determination process that air bubbles more than or equal to the predetermined amount are trapped.

When a coolant reservoir for adjusting the amount of the coolant is provided on the fuel cell-side coolant circulation flow passage, the liquid level in the coolant reservoir is likely to become lower as the amount of the trapped air bubbles increases. On the basis of this, it can be determined in the air bubble determination process that, when the liquid level in the coolant reservoir is lower than or equal to a predetermined lower-limit threshold, air bubbles more than or equal to the predetermined amount are trapped. Not to mention, the above-described two determination methods may be used concurrently.

To remove air bubbles from the coolant, for example, the first coolant pump may be operated at a predetermined number of revolutions or less. This is because in such a case, the amount of the coolant guided to the gas liquid separator is within the range of gas liquid separation performance of the gas liquid separator. That is, the coolant is sufficiently separated into a vapor phase and a liquid phase in the gas liquid separator and as a result, the amount of the air bubbles in the coolant is reduced within tolerance. Accordingly, when a state in which the number of revolutions of the first coolant pump is lower than or equal to a predetermined value continues for predetermined time, it can be determined that air bubbles are removed.

A command to bring the air conditioning equipment-side coolant circulation flow passage and the air conditioning mechanism into the disconnected state is issued when for example, the air conditioning mechanism is stopped. Even in such a case, while air bubbles are being removed, no disconnection is caused between the air conditioning equipment-side coolant circulation flow passage and the air conditioning mechanism as described above.

Even if it is determined in the air bubble determination process that air bubbles more than or equal to the predetermined amount are trapped in the coolant, when the temperature of the fuel cell falls below a predetermined temperature, it is desirable to bring the air conditioning equipment-side coolant circulation flow passage and the air conditioning mechanism into the disconnected state by operating the three-way valve. That is, even if it is determined in the state determination process that the air conditioning equipment-side coolant circulation flow passage and the air conditioning mechanism are in the connected state, when the temperature of the fuel cell falls below the predetermined temperature after that, it is desirable to issue a command to bring the air conditioning equipment-side coolant circulation flow passage and the air conditioning mechanism into the disconnected state by operating the three-way valve. This is because by executing the command, further decrease in the temperature of the fuel cell can be avoided.

It can be assumed that a command to bring the air conditioning equipment-side coolant circulation flow passage and the air conditioning mechanism into the disconnected state (a command to operate the three-way valve) is issued while an air bubble removal operation is being performed. In such a case, the disconnected state may be caused by operating the three-way valve after the removal operation ends.

Obviously, numerous modifications and variations of the present invention are possible in light of the above teachings. It is therefore to be understood that within the scope of the appended claims, the invention may be practiced otherwise than as specifically described herein.

What is claimed is:

1. A method of controlling a fuel cell system including a fuel cell, comprising:
    circulating a coolant through a fuel cell circulation passage in which the fuel cell and a gas liquid separator are provided;
    controlling a valve selectively to connect or disconnect the fuel cell circulation passage and an air conditioning equipment circulation passage in which an air conditioning mechanism is provided;
    determining whether the coolant includes air bubbles more than or equal to a threshold amount; and
    maintaining the valve to connect the fuel cell circulation passage and the air conditioning equipment circulation passage to circulate the coolant through the air conditioning equipment circulation passage when it is determined that the coolant includes air bubbles more than or equal to the threshold amount, when the valve connects the fuel cell circulation passage and the air conditioning equipment circulation passage, and when a temperature of the fuel cell is higher than or equal to a threshold temperature even if the air conditioning mechanism stops.

2. The method according to claim 1, wherein
    a coolant pump is provided on the fuel cell circulation passage, and
    when the number of revolutions of the coolant pump is larger than or equal to a predetermined value, it is determined that the coolant includes air bubbles more than or equal to the predetermined amount.

3. The method according to claim 1, wherein
    the fuel cell system further includes a coolant reservoir that is provided on the fuel cell circulation passage and used to adjust an amount of the coolant, and
    when a liquid level in the coolant reservoir is lower than or equal to a predetermined lower-limit threshold, it is determined that the coolant includes air bubbles more than or equal to the threshold amount.

4. The method according to claim 1, wherein
    a coolant pump is provided on the fuel cell circulation passage, and
    when a state in which the number of revolutions of the coolant pump is lower than or equal to a predetermined value continues for predetermined time, it is determined that air bubbles are removed.

5. The method according to claim 1, wherein
    when the air conditioning mechanism is stopped, a command to bring the air conditioning equipment circulation passage and the air conditioning mechanism into a disconnected state is issued.

6. The method according to claim 5, wherein
when a temperature of the fuel cell falls below a predetermined temperature after it is determined that the coolant includes air bubbles more than or equal to the threshold amount, the command to bring the air conditioning equipment circulation passage and the air conditioning mechanism into the disconnected state by controlling the valve is issued.

7. The method according to claim 6, wherein
when the command to cause the disconnected state is issued while an air bubble removal operation is being performed, the disconnected state is caused by controlling the valve after the removal operation ends.

8. The method according to claim 1, wherein
a heat exchanger is provided on the fuel cell circulation passage to cool the coolant.

9. A method of controlling a fuel cell system including a fuel cell, comprising:
circulating a coolant through a fuel cell circulation passage in which the fuel cell and a gas liquid separator are provided;
controlling a valve selectively to connect or disconnect the fuel cell circulation passage and an air conditioning equipment circulation passage in which an air conditioning mechanism is provided;
determining whether the coolant includes air bubbles more than or equal to a threshold amount; and
maintaining the valve to connect the fuel cell circulation passage and the air conditioning equipment circulation passage to circulate the coolant through the air conditioning equipment circulation passage when it is determined that the coolant includes air bubbles more than or equal to the threshold amount, when the valve connects the fuel cell circulation passage and the air conditioning equipment circulation passage, and when a temperature of the fuel cell is higher than or equal to a threshold temperature even if a condition for issuing a command to disconnect the fuel cell circulation passage and the air conditioning equipment circulation passage is satisfied.

* * * * *